US012581289B2

(12) United States Patent
Maga

(10) Patent No.: US 12,581,289 B2
(45) Date of Patent: Mar. 17, 2026

(54) METHOD AND DEVICE FOR AUTHENTICATING A MOTOR VEHICLE AT A HYDROGEN FUEL PUMP

(71) Applicant: Robert Bosch GmbH, Stuttgart (DE)

(72) Inventor: Iulian Maga, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 57 days.

(21) Appl. No.: 18/699,648

(22) PCT Filed: Sep. 26, 2022

(86) PCT No.: PCT/EP2022/076664
§ 371 (c)(1),
(2) Date: Apr. 9, 2024

(87) PCT Pub. No.: WO2023/061736
PCT Pub. Date: Apr. 20, 2023

(65) Prior Publication Data
US 2025/0234188 A1     Jul. 17, 2025

(30) Foreign Application Priority Data

Oct. 14, 2021     (DE) ..................... 10 2021 211 584.5

(51) Int. Cl.
*H04W 12/03*     (2021.01)
*F17C 5/00*     (2006.01)
*B60S 5/02*     (2006.01)

(52) U.S. Cl.
CPC ............. *H04W 12/03* (2021.01); *F17C 5/007* (2013.01); *B60S 5/02* (2013.01); *F17C 2221/012* (2013.01);

(Continued)

(58) Field of Classification Search
None
See application file for complete search history.

(56) References Cited

U.S. PATENT DOCUMENTS 6,202,710 B1 *  3/2001  Dill .......................... B60L 58/30
                                                      141/285
8,943,187 B1 *  1/2015  Saylor ................ G07C 9/00857
                                                      709/225

(Continued)

FOREIGN PATENT DOCUMENTS

CN      103415013 A  * 11/2013
DE      102013202234 A1     8/2014

(Continued)

OTHER PUBLICATIONS

Translation of International Search Report for Application No. PCT/EP2022/076664 dated Dec. 12, 2022 (2 pages).

*Primary Examiner* — Michael W Chao
(74) *Attorney, Agent, or Firm* — Michael Best & Friedrich LLP

(57) ABSTRACT

Method for authenticating a motor vehicle (13) at a hydrogen fuel pump (11), characterized by the following features: the motor vehicle (13) is identified based on an identifier fitted in the interior (14) of the motor vehicle (13). a key is retrieved from the motor vehicle (13) by the mobile phone (12) via a radio link, the key is transferred to the hydrogen fuel pump (11) by means of an NFC transceiver (15) and a link, which is encrypted with the key, is built up to the motor vehicle (13) by the hydrogen fuel pump (11) via a wireless computer network (16).

9 Claims, 2 Drawing Sheets

(52) U.S. Cl.
CPC ................... *F17C 2250/032* (2013.01); *F17C 2250/0439* (2013.01); *F17C 2265/065* (2013.01); *F17C 2270/0178* (2013.01)

(56) References Cited

U.S. PATENT DOCUMENTS

| | | | | |
|---|---|---|---|---|
| 9,634,726 | B2 * | 4/2017 | Kuscher | H04W 4/70 |
| 12,135,113 | B1 * | 11/2024 | Lerner | B60S 5/02 |
| 2006/0159268 | A1 | 7/2006 | Jung et al. | |
| 2012/0060935 | A1 * | 3/2012 | Carter | F02D 19/023 |
| | | | | 137/511 |
| 2013/0087244 | A1 * | 4/2013 | Maier | G02F 1/1303 |
| | | | | 141/94 |
| 2013/0318249 | A1 * | 11/2013 | McDonough | H04L 67/148 |
| | | | | 709/228 |
| 2014/0110017 | A1 * | 4/2014 | Gupta | F17C 5/06 |
| | | | | 141/82 |
| 2014/0191718 | A1 * | 7/2014 | Reineccius | B60L 53/65 |
| | | | | 320/108 |
| 2014/0263628 | A1 | 9/2014 | McQuade et al. | |
| 2015/0009016 | A1 * | 1/2015 | Dai | H04W 4/80 |
| | | | | 340/10.1 |
| 2015/0310681 | A1 * | 10/2015 | Avery | G07C 9/00571 |
| | | | | 340/5.61 |
| 2016/0057139 | A1 * | 2/2016 | McDonough | H04L 63/168 |
| | | | | 726/6 |
| 2018/0234843 | A1 * | 8/2018 | Smyth | H04W 12/03 |
| 2019/0064834 | A1 * | 2/2019 | Adams | G06Q 10/20 |
| 2019/0197808 | A1 * | 6/2019 | Jinnai | B60R 25/24 |
| 2019/0311110 | A1 * | 10/2019 | Tabak | H04W 12/06 |
| 2020/0223396 | A1 * | 7/2020 | Yi | B60R 25/255 |
| 2020/0262695 | A1 | 8/2020 | Patil et al. | |
| 2020/0276909 | A1 * | 9/2020 | Boisen | B60L 50/71 |
| 2020/0361335 | A1 * | 11/2020 | Penilla | B60R 25/241 |
| 2021/0168602 | A1 * | 6/2021 | Kim | H04W 12/041 |
| 2021/0250355 | A1 * | 8/2021 | Galdo | G06F 21/335 |
| 2021/0331646 | A1 * | 10/2021 | Schubert | B60R 25/241 |
| 2022/0058329 | A1 * | 2/2022 | Ricci | G06F 21/44 |
| 2022/0136655 | A1 * | 5/2022 | Pollica | B67D 7/80 |
| 2022/0414797 | A1 * | 12/2022 | Nakagawa | H04L 9/30 |
| 2023/0003536 | A1 * | 1/2023 | Nakagawa | G06Q 30/0283 |

FOREIGN PATENT DOCUMENTS

| | | |
|---|---|---|
| DE | 102014210813 B3 | 10/2015 |
| DE | 102018210961 A1 | 1/2020 |
| DE | 102019219826 A1 | 6/2021 |
| EP | 2605566 A1 | 6/2013 |
| JP | 2020030457 A | 2/2020 |
| JP | 2021147959 A | 9/2021 |
| WO | 2020172100 A1 | 8/2020 |

\* cited by examiner

METHOD AND DEVICE FOR AUTHENTICATING A MOTOR VEHICLE AT A HYDROGEN FUEL PUMP

BACKGROUND

The present invention relates to a method for authenticating a motor vehicle at a hydrogen fuel pump. The present invention also relates to a corresponding device, a corresponding computer program, and a corresponding machine-readable storage medium.

A hydrogen filling station has fuel pumps, nozzles, and pumps that can be used to replenish the energy supply of fuel cell vehicles or other mobile hydrogen consumers. In the prior art, for example, liquid hydrogen ($LH_2$) is offered at a temperature of up to −253° C. and a pressure of up to 16.5 bar and gaseous hydrogen ($GH_2$) at a temperature of 20° C. and a pressure of 250 or 350 bar or a temperature of −40° C. and a pressure of 700 bar.

DE102019219826A1 relates to a method for refueling a vehicle with a hydrogen tank containing gaseous hydrogen. The method is carried out in the following method steps: The vehicle enters a refueling area. A refueling step is carried out on the vehicle. An initial tank temperature check is then carried out on the contents of the at least one hydrogen tank. If the temperature of the tank contents of the at least one hydrogen tank exceeds a temperature limit, the vehicle is transferred to a cool-down area. After a cooling phase, a second tank temperature check is carried out there. If the tank temperature is below a temperature limit, the tank pressure is checked. If the tank pressure in the at least one hydrogen tank is below a tank pressure limit value, the vehicle is transferred to the refueling area for further refueling; if the tank pressure is within the tank pressure limit value, refueling ends.

SUMMARY

The invention provides a method for authenticating a motor vehicle at a hydrogen fuel pump, a corresponding device, a corresponding computer program, and a corresponding storage medium according to the independent claims.

The approach according to the invention is based on the realization that refueling a vehicle at a hydrogen filling station is a controlled process. Data must therefore be exchanged between the vehicle and the fuel pump during the refueling process. The refueling process is monitored and controlled by the fuel pump throughout its entire duration; the vehicle supplies the tank data required for this, e.g., its temperature.

If this data exchange takes place via a radio link, the assignment between vehicle and fuel pump is of crucial importance. For safety reasons, any confusion in this respect must be ruled out. This poses a challenge at a gas station with several pumps, as it is difficult to determine the exact location of the vehicle using known standards for wireless networks such as Bluetooth, WLAN, or ZigBee.

In the event of a mix-up, the integrity of the vehicle tank would be jeopardized by the incorrect assignment of data between the vehicle and the fuel pump. Damage to this in turn could result in an uncontrolled escape of hydrogen and injury to filling station customers and operating personnel.

Against this background, one advantage of the solution according to the invention is that it ensures reliable location-dependent assignment of the vehicle to the fuel pump and secure data exchange between the two participants. An intermediary in the form of a mobile phone with an NFC radio interface is used for this purpose.

The measures listed in the dependent claims and described below enable advantageous further developments and improvements of the basic idea stated in the independent claim. In addition to the key used for authentication, the mobile phone can retrieve the name of the wireless computer network (extended service set identifier, ESSID) that can be used to contact the vehicle from the vehicle. In this way, this radio network can remain "invisible", so to speak, and only allow clients to log in who know its ESSID. This hardens the system against snarfing attacks.

BRIEF DESCRIPTION OF THE DRAWINGS

Exemplary embodiments of the invention are shown in the drawings and explained in more detail in the following description. The following is shown in the figures.

DETAILED DESCRIPTION

Figure 1:
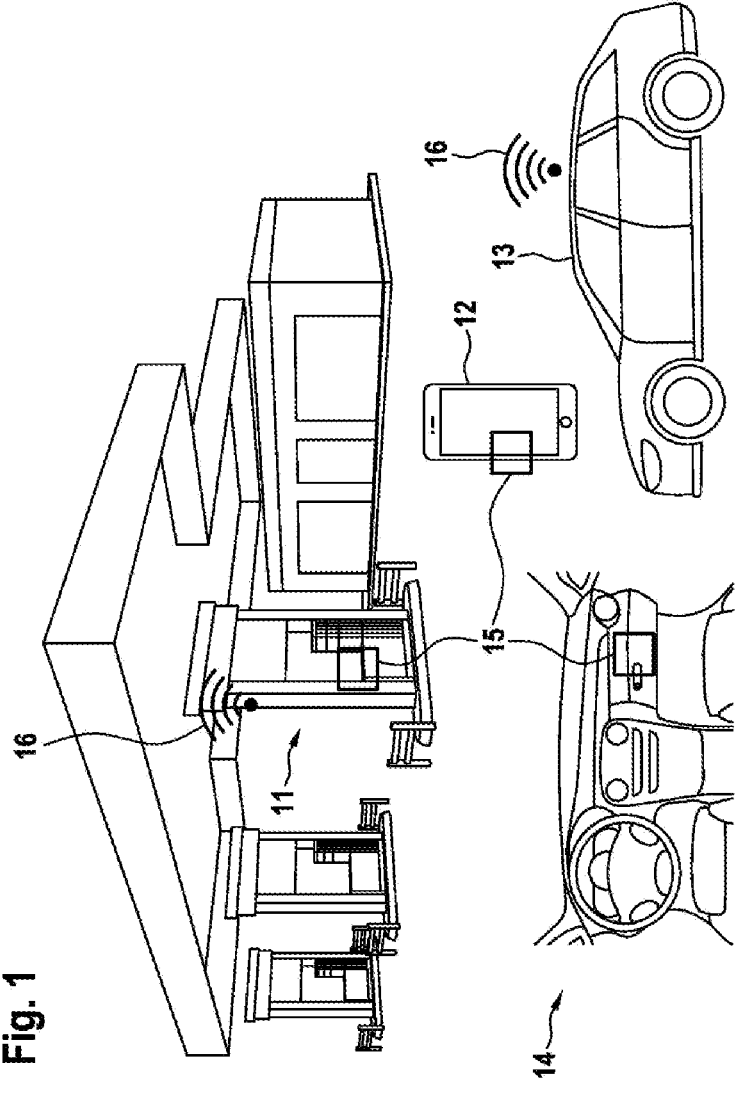
FIG. 1 the participants of a hydrogen refueling.

FIG. 1 illustrates the key players in a method according to the invention:

The hydrogen fuel pump 11 has an NFC transceiver 15 and a wireless computer network 16. The latter term is used here in a broad sense and comprises wireless local area networks (WLANs) according to the IEEE 802.11 protocol family as well as wireless personal area networks (WPANs) according to the ZigBee or EnOcean standards and Bluetooth piconets.

For its part, the mobile phone 12 has an NFC transceiver 15 and a mobile application (app).

Finally, like the hydrogen filling station 11, the motor vehicle 13 has an NFC transceiver 15 and access to the wireless computer network 16.

Figure 2:
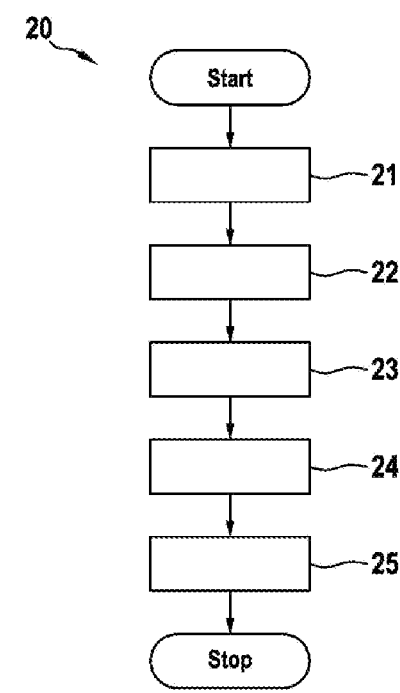
FIG. 2 the flow chart of a method according to a first embodiment.

The actual authentication process is now explained using FIG. 2:

In a first step (process 21), the driver holds the mobile phone 12 to an NFC field in the interior (14—FIG. 1) of the vehicle 13. To prevent identification theft, the position of this field should be selected so that the described interaction is only possible when the mobile phone 12 and the operator are in the interior 14.

In a second step (process 22), the mobile phone 12 uses its NFC transceiver 15 to establish a link to the central control unit of the motor vehicle 13 with the aid of the app and retrieves a temporary encryption key and the name of the radio network used by the motor vehicle 13, which are stored in the app and displayed to the vehicle driver together with the expiration date.

In a third step (process 23), after leaving the vehicle 13, the driver holds the mobile phone 12 to a corresponding NFC field of the hydrogen fuel pump 11 and uses the app to initiate the transfer of the encryption key and the name of the vehicle radio network.

If this transfer (23) is successfully completed, which is acknowledged by a notification from the app, the hydrogen fuel pump 11 builds up an encrypted link to the central control unit of the motor vehicle 13 via the wireless computer network 16 in a fourth step (process 24). As soon as this link is established, the hydrogen fuel pump 11 starts refueling and regulates it by means of the link. After its transfer (23) to the hydrogen fuel pump 11, but at the latest when the key expires, it is automatically deleted from the mobile phone 12.

After refueling, the hydrogen fuel pump 11 terminates the link via the wireless computer network 16. The encryption key loses its validity and is deleted by the central control unit of the vehicle 13.

The identification (21) of the motor vehicle 13 can also take place only once by means of the NFC transceiver 15 and—comparable to the pairing of Bluetooth devices via NFC tag—serve to build up a permanent encrypted radio link between the mobile phone 12 and the motor vehicle 13 via the wireless computer network 16. In this case, the vehicle driver explicitly requests a new encryption key in the app.

Another variant for retrieving (22) the temporary encryption key involves replacing the NFC field with a DataMatrix code on the inside of the side compartment. In this embodiment, the motor vehicle 13 is identified (21) by scanning the code using the mobile phone 12, whereupon the app builds up an encrypted radio link between the mobile phone 12 and the central control unit of the motor vehicle 13 via the wireless computer network 16 in order to retrieve the temporary encryption key. After the retrieval (22), this radio link is terminated again.

The data recorded during refueling can be stored in the cloud by the central control unit of the vehicle 13 via an LTE link and used by service providers for billing or diagnostics, e.g., to predict the service life of the hydrogen tank.

This method (20) can, for example, be implemented in software or hardware or in a hybrid form of software and hardware, for example in the mobile phone 12.

The invention claimed is:

1. A method (20) for authenticating a motor vehicle (13) at a hydrogen fuel pump (11), the method comprising:

identifying (21), via a mobile phone (12), the motor vehicle (13) via an identifier fitted in the interior (14) of the motor vehicle (13), retrieving (22) a key from the vehicle (13) via the mobile phone (12) through a radio link between the mobile phone (12) and the motor vehicle (13), transferring (23) the key to the hydrogen fuel pump (11) via an NFC transceiver (15) of the mobile phone (12), and creating (24) a link to the vehicle (13) encrypted with the key (24) via the hydrogen fuel pump (11) through a wireless computer network (16), wherein the hydrogen fuel pump (11) controls a refueling process of the motor vehicle (13) via the hydrogen fuel pump (11) based on tank temperature data provided by the motor vehicle (13) through the link.

2. The method (20) according to claim 1, wherein:

after the refueling process, the link is disconnected (25) by the hydrogen fuel pump (11).

3. The method (20) according to claim 1, wherein:

the identification (21) of the motor vehicle (13) and retrieval (22) of the key are carried out consecutively by means of the NFC transceiver (15).

4. The method (20) according to claim 1, wherein:

the motor vehicle (13) is identified (21) once by means of the NFC transceiver (15) and the radio link between the mobile phone (12) and the motor vehicle (13) is permanently maintained via the wireless computer network (16) and encrypted with the identifier.

5. The method (20) according to claim 1, wherein:

the identifier is a DataMatrix code, the motor vehicle (13) is identified (21) by scanning the code using the mobile phone (12), and the radio link between the mobile phone (12) and the motor vehicle (13) is temporarily built up via the wireless computer network (16) and secured by means of the identifier.

6. The method (20) according to claim 1, wherein:

the computer network (16) is a local network in accordance with IEEE 802.11, the computer network (16) is a Bluetooth piconet, the computer network (16) is a ZigBee network, or the computer network (16) is an EnOcean network.

7. The method (20) according to claim 1, wherein:

the key has a specified expiration date and the key is automatically deleted from the mobile phone (12) by the expiration date at the latest.

8. A device adapted to perform the method (20) according to claim 1.

9. A non-transitory, computer-readable storage medium containing instructions that when executed by a computer cause the computer to authenticate a motor vehicle (13) at a hydrogen fuel pump (11), by identifying (21), via a mobile phone (12), the motor vehicle (13) via an identifier fitted in the interior (14) of the motor vehicle (13), retrieving (22) a key from the vehicle (13) via the mobile phone (12) through a radio link, transferring (23) the key to the hydrogen fuel pump (11) via an NFC transceiver (15), and creating (24) a link to the vehicle (13) encrypted with the key (24) via the hydrogen fuel pump (11) through a wireless computer network (16), wherein the hydrogen fuel pump (11) controls a refueling process of the motor vehicle (13) via the hydrogen fuel pump (11) based on tank temperature data provided by the motor vehicle (13) through the link.

* * * * *